US007292864B1

(12) United States Patent
Al-Khashti et al.

(10) Patent No.: US 7,292,864 B1
(45) Date of Patent: Nov. 6, 2007

(54) METHOD AND SYSTEM FOR TAILORING OUTPUT FROM A LOCATION-DETERMINATION SYSTEM

(75) Inventors: Khaled Al-Khashti, Overland Park, KS (US); Keith Moll, Olathe, KS (US); Brent Burpee, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 290 days.

(21) Appl. No.: 10/753,203

(22) Filed: Jan. 7, 2004

(51) Int. Cl.
*H04Q 7/20* (2006.01)
(52) U.S. Cl. .............. 455/456; 455/435; 455/406; 455/414; 455/550; 455/422; 455/556; 455/560; 340/905
(58) Field of Classification Search .......... 455/456, 455/435, 406, 414, 550, 422, 556, 560, 561, 455/566, 575; 340/905
See application file for complete search history.

(56) References Cited

U.S. PATENT DOCUMENTS

| | | | | |
|---|---|---|---|---|
| 6,073,013 | A * | 6/2000 | Agre et al. ............... 455/428 |
| 6,134,447 | A * | 10/2000 | Havinis et al. .......... 455/456.6 |
| 6,442,394 | B1 * | 8/2002 | Valentine et al. ........ 455/456.3 |
| 6,650,902 | B1 * | 11/2003 | Richton ................. 455/456.3 |
| 6,888,811 | B2 * | 5/2005 | Eaton et al. .............. 370/338 |
| 2002/0098844 | A1 * | 7/2002 | Friedenfelds et al. ....... 455/445 |
| 2002/0154058 | A1 * | 10/2002 | Pande et al. ........... 342/357.09 |
| 2003/0148771 | A1 * | 8/2003 | de Verteuil ................ 455/456 |
| 2004/0043773 | A1 * | 3/2004 | Lee et al. ................ 455/456.1 |
| 2004/0203900 | A1 * | 10/2004 | Cedervall et al. ........ 455/456.1 |
| 2004/0205198 | A1 * | 10/2004 | Zellner et al. ............. 709/228 |
| 2005/0066044 | A1 * | 3/2005 | Chaskar et al. ............ 709/230 |
| 2005/0066179 | A1 * | 3/2005 | Seidlein .................... 713/182 |
| 2005/0118999 | A1 * | 6/2005 | Zhu ....................... 455/432.1 |
| 2005/0136895 | A1 * | 6/2005 | Thenthiruperai et al. ................... 455/412.2 |
| 2005/0136941 | A1 * | 6/2005 | Asho et al. ............... 455/456.1 |

OTHER PUBLICATIONS

TR-45, Enhanced Wireless 9-1-1 Phase 2, J-STD-036, Jul. 12, 2000.
TR45.5/99.10.15.11, "Position Determination Service Standard for Dual-Mode Spread Spectrum Systems," Oct. 15, 1999.
Samuli Niiranen, "Location Services for Mobile Terminals," printed from the World Wide Web in 2003.

(Continued)

*Primary Examiner*—William Trost
*Assistant Examiner*—Julio Perez

(57) ABSTRACT

A method and system for tailoring responses from a location-determination system. A location-determination system will receive a position request from a location-based service (such as a PSAP), seeking the location of a wireless communication device, and the location-determination system will provide a position response, indicating the location of the wireless communication device. A rules engine positioned in the communication path between the location-determination system and the location-based service will intercept the position response and will tailor the response in a manner dependent on the identity of the location-based service that sent the request. Advantageously, a wireless service provider can control operation of the rules engine to dictate how to tailor various position responses, without the need to modify operation of the location-determination system.

17 Claims, 7 Drawing Sheets

OTHER PUBLICATIONS

Jonathan Lowe, "Net Results—Which Where Will Win?," Geospatial Solutions, Mar. 2001.
Openwave, Openwave Safety First, 2002.
Intrado Informed Response, Ron Mathis, "SCEC Workshop," Oct. 10, 2002.
Tower Insights: Industry Profile #4, "Deployment of Wireless E911 and the Wireless Infrastructure Industry," printed from the World Wide Web in 2003.
3G, 3rd Generation Partnership Project 2 "3GPP2", "Wireless IIP Architecture Based on IETF Protocols," Jul. 14, 2000.

* cited by examiner

| RULES TABLE ||
|---|---|
| WCD-IDENTIFIER | RULE(S) |
| 9135551111 - 9135552222 | MOBILE-OR-FIXED( )<br>OVERLAP-THRESHOLD( ) |
| 9135552223 - 9135554444 | CACHE-TIMER(200)<br>OVERLAP-THRESHOLD( ) |
| 9135554445 - 9135557777 | MOBILE-OR-FIXED( ) |
| 9135557778 - 9135559999 | MOBILE-OR-FIXED( )<br>OVERLAP-THRESHOLD( )<br>CACHE-TIMER(0) |

FIG. 7

METHOD AND SYSTEM FOR TAILORING OUTPUT FROM A LOCATION-DETERMINATION SYSTEM

BACKGROUND

1. Field of the Invention

The present invention relates to enhanced wireless telecommunications service using location-based services, and more particularly to systems and methods for controlling location-determination in a wireless communication system.

2. Description of Related Art

Wireless service providers have been developing techniques for determining the geographical location of a wireless communication device (WCD), such as a cell phone or wirelessly-equipped PDA or computer. Wireless service providers are primarily motivated to implement such techniques by the need to interface with emergency services such as enhanced 911. Nevertheless, as location determination techniques have become more precise and more accurate, wireless service providers are finding many more applications that use location determination techniques. For example, an application now available allows a user of one WCD to determine the geographical location of the user of another WCD. Other applications provide users with useful information based on their geographical position, such as the location of the nearest service station or the nearest restaurant.

Efforts by wireless service providers to improve location-based services have been complicated by the need to work with a variety of third party providers, such as location-based service providers, and vendors of location-determination equipment.

By way of example, wireless service providers typically work with third party Public Safety Access Points (PSAP), which provide 911 emergency services. Further, wireless service providers typically work with third party vendors of location-determination systems, including components such as a "mobile positioning center" (MPC) for instance. When a WCD places a 911 call, the wireless service provider may connect the call to the PSAP and may further employ the location-determination system to determine the location of the WCD and to report the location to the PSAP.

In typical practice, to determine the location of the WCD, the MPC will invoke position determining equipment (PDE), which can determine the location of the WCD in various ways. One way the PDE could determine the WCD location is through triangulation. Triangulation would typically provide a latitude/longitude reading together with an uncertainty value. Another way that is usually more accurate is by sending a location-determination request message to the WCD itself and having the WCD employ a GPS (global positioning system) module or other mechanism to determine its own location. The WCD would then return an indication of its location, also typically as a latitude/longitude reading together with an uncertainty value, back to the MPC.

While standards have been implemented to govern communications between a wireless carrier and location-based services (such as PSAPs), including communications between an MPC and the location-based service for instance, specific implementations can exhibit unexpected behavior that may affect operations in the wireless network or that may be contrary to the desires of the wireless service provider or others.

For example, one problem that can occur is that a location-based service may repeatedly request the MPC to report the location of the calling WCD. In the arrangement where the MPC determines the WCD location by querying the WCD itself, each time the MPC does so the WCD may switch from using its primary voice transceiver (which it may be using to communicate with the location-based service) to using a GPS receiver or other logic so as to determine its location and report its location back to the MPC. Consequently, if the location-based service repeatedly requests the MPC to report the location of the WCD, multiple disruptions of the voice call could occur. Even though these disruptions may be brief, they are undesirable.

As another example, an MPC may be arranged to provide a response to a position request in a standard format, providing a standard set of information. Yet some location-based service providers, such as some PSAPs, might want to have the position response data be formatted in a special manner or to include or exclude certain information. Unfortunately, if the MPC is set to provide position responses in a standard, fixed format, it may not be possible to accommodate the format desires of these location-based services.

Further, an MPC is typically configured to apply a fixed set of location-determination logic when determining the location of any WCD, and the wireless service provider will have little if any control over the manner in which that location-determination logic operates. If the wireless service provider wants to modify the operation of the MPC in some way, the wireless service provider would typically need to work with the MPC vendor to arrange for revisions of the MPC program logic, which can be both time consuming and expensive.

SUMMARY

The present invention helps to solve the foregoing problems by providing a location rules engine that sits outside of the location-determination system and that controls the location-determination process in one or more ways. Generally speaking, the rules engine may be situated within the communication path between the location-determination system and the location-based service (e.g., PSAP), so that the rules engine can intercept and operate on position requests sent to the location-determination system and position responses received from the location-determination system. Alternatively, the rules engine can be positioned anywhere, and the location-determination system can be arranged to execute logic in the rules engine, so as to define how the location-determination system goes about determining location in a given instance.

Advantageously, by providing such a rules engine outside of the location-determination system, a wireless service provider can readily modify the logic in the rules engine so as to thereby modify how the location-determination system goes about determining location and/or how position requests and position responses are handled.

In one embodiment, for example, the rules engine can function to preclude repeated position requests to the MPC, so as to avoid repeated disruptions at the WCD. To do so, when the MPC returns the position of a WCD in response to a position request from the location-based service, the rules engine will cache the position. The next time the location-based service sends a position request seeking the position of the same WCD (preferably during the same call), the rules engine will then respond to the location-based service with the cached location, rather than passing the request along to the MPC.

In another embodiment, the rules engine will function to tailor a position-response from the MPC in a manner appropriate for receipt by the requesting location-based service. For instance, the rules engine may maintain or have access to a set of templates each indicating how to format or filter a position response for a particular location-based service (e.g., a particular PSAP). When the rules engine receives a position request from a given location-based service, the position request would carry an identifier of the location-based service. The rules engine would pass the position request along to the MPC, and the MPC would in turn provide a position response indicating the location of the WCD. Based on the location-based service identifier, the rules engine would then tailor the position response in a manner appropriate for the requesting location-based service and then send the tailored position response along to that location-based service.

In yet another embodiment, the rules engine will be configured with rules logic executable by the MPC to define how the MPC should go about determining location in a given instance. For example, the rules engine may maintain stored logic modules and may maintain data that specifies, for a given WCD and/or for a given location-based service, which logic module(s) the MPC should execute and in what order the MPC should execute specified logic modules. The logic modules can cause the MPC to carry out various useful functions, such as (i) checking whether the WCD at issue is a fixed or mobile WCD and invoking a PDE only if the WCD is mobile, (ii) setting a cache timer in the MPC to define how long the MPC should cache a determined location, and (iii) setting one or more location-determination parameters that govern whether the MPC should report GPS location, cell/sector location, or some other sort of location for a given WCD.

These and other aspects and advantages will become apparent to those of ordinary skill in the art by reading the following detailed description, with reference where appropriate to the accompanying drawings. Further, it should be understood that the embodiments noted in this summary are not intended to limit the scope of the invention as claimed.

BRIEF DESCRIPTION OF THE DRAWINGS

FIG. 7 is an example of a rules table that may be maintained by a location rules engine.

DETAILED DESCRIPTION OF AN
EXEMPLARY EMBODIMENT

1. Overview

Generally speaking, a wireless service provider may provide access to location-based services (such as emergency services) that are typically offered by third-party service providers to subscribers, via a wireless serving network. In particular, a subscriber may access a location-based service by placing a call to the location-based service from a WCD, via the wireless serving network.

The wireless service provider may further facilitate the location-based service by employing a location-determining system that reports the location of the WCD that is placing the call. The location-based service may thus communicate with the location-determining system to request the location of the calling WCD. And the location-determining system may determine or retrieve the location of the WCD and report the location to the location-based service. The location-based service may then use that location to serve the calling subscriber.

In an embodiment of the invention, a location rules engine will control communication with, and/or use of, the location-determination system, so as to help ensure conformance with the requirements and expectations of the wireless service provider. Advantageously, the location rules engine can be positioned just outside of the MPC, so that the rules engine can be privy to each position request that passes to the MPC and each position response that comes from the MPC. For instance, if the MPC communicates via a network/link, the rules engine can be connected between the MPC and the network/link, so that messages to and from the MPC pass through the rules engine. Alternatively, for some purposes, the rules engine can be located anywhere external to the MPC, and the MPC could be arranged to query the rules engine for guidance, such as to obtain logic for use in determining the location of a WCD.

A wireless service provider can configure the rules engine to control location-determination in various beneficial ways. In one respect, for instance, the wireless service provider could configure the rules engine to filter requests for the position of a WCD, so as to avoid repeated location-determinations and resulting interruptions of voice calls. In another respect, the wireless service provider could configure the rules engine to tailor the format of each position response from the MPC to be appropriate for the requesting location-based service provider. In yet another respect, the wireless service provider could configure the rules engine with logic that the MPC could reference when determining the location of a WCD, and the logic could control the manner in which the MPC determines the location of the WCD.

2. Wireless Location-Based Services Infrastructure

Figure 1:
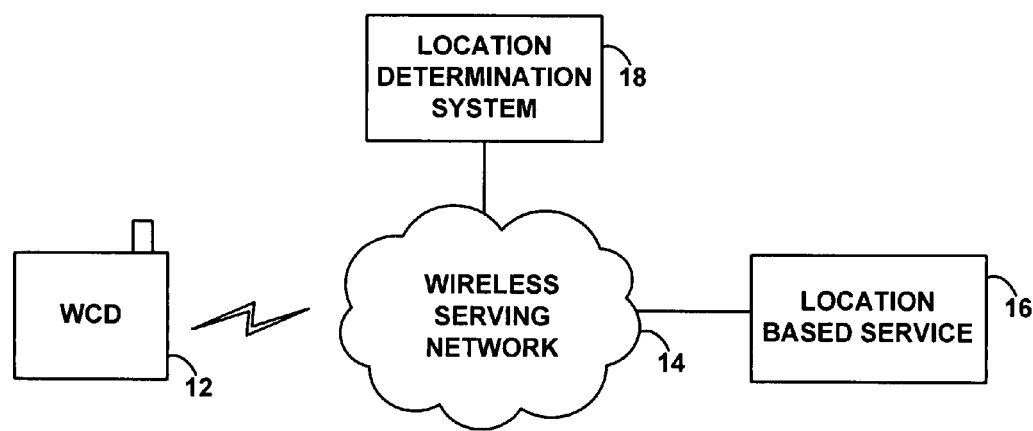
FIG. 1 is a generalized block diagram depicting an example location-based services infrastructure.

FIG. 1 depicts an example of a wireless communication system in which an exemplary embodiment of the invention can be employed. It should be understood, however, that this system is presented merely as an example, and many variations are possible. The example communication system includes a WCD 12 that is served by a wireless serving network 14. The wireless serving network 14 in turn provides connectivity to a location-based service 16. Further, the wireless serving network includes or is connected with a location-determination system 18.

In this general arrangement, a user of WCD 12 may engage in a communication with location-based service 16. In order to provide information to the user or to otherwise serve the user, location-based service 16 may then send a message to location-determination system 18, asking for the location of WCD 12. Location-determination system 18 may then responsively determine the location of WCD 12 and report the location in a response message to the location-based service 16. Location-based service 16 may then use the location of the WCD as a basis to derive information for the user (or may consider the location itself to be the information). And location-based service 16 may then send the information to the user.

Figure 2:
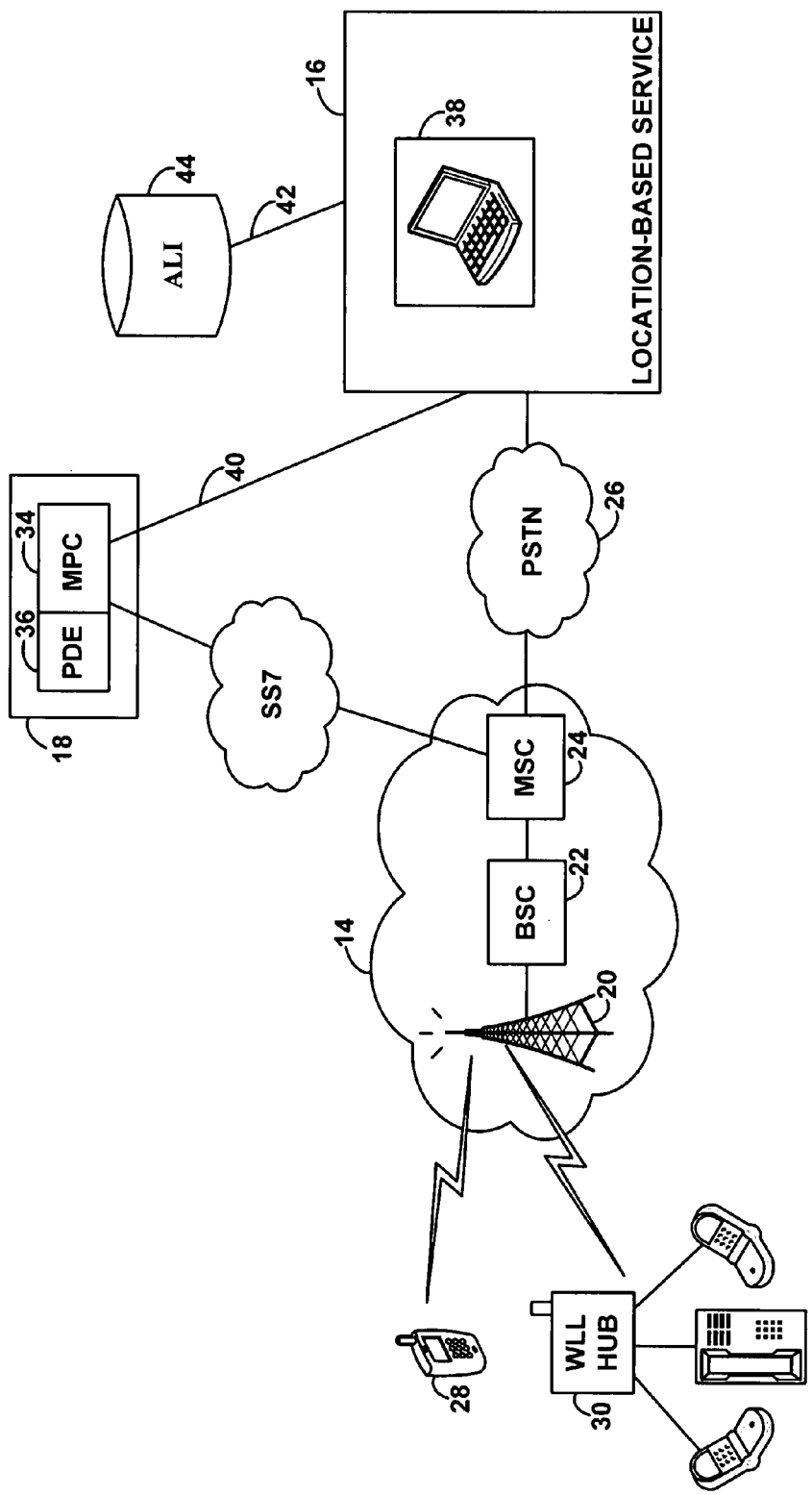
FIG. 2 is a more specific block diagram depicting an example location-based services infrastructure.

Referring next to FIG. 2, a more detailed block diagram is provided, to show more particularly (but still by way of example) how the network can be configured in practice. FIG. 2 depicts the wireless serving network 14 as including a base transceiver station (BTS) 20, a base station controller (BSC) 22, and a mobile switching center (MSC) 24. The BTS 20 radiates to define a cell in which one or more WCDs can operate. In a typical arrangement, the BTS will have antennas that radiate directionally to define three or more sectors of the cell, each functioning as a separate coverage area in the system. The BSC 22 in turn controls communications within the cell and sectors, engaging in functions such as handing off WCDs as they move between sectors, and so forth. The MSC 24 in turn provides connectivity with the public switched telephone network (PSTN) 26.

FIG. 2 further illustrates that the WCD can itself take various forms. As noted above, for instance, a WCD can be fixed or mobile. (In reality, a fixed WCD may actually be movable, but is generally fixed in place, whereas a mobile WCD is normally intended to be carried from place to place.) A mobile WCD 28 may take the form of a cell phone, wirelessly equipped PDA or portable computer, or other wirelessly-equipped portable device. A fixed WCD 30, on the other hand, may take the form of a wireless local loop (WLL) hub (which typically sits in a building and provides wireless telephone connectivity for landline devices such as conventional telephones for instance), a wireless payphone, or a wireless wall-phone (i.e., a cell phone that resides on a wall at a fixed location). Other examples are possible as well.

In a typical arrangement, the MSC 24 will be coupled through an out-of-band signaling network (e.g., an SS7 network) with the location-determination system 18. As further shown, the location-determination system typically comprises an MPC 34 and one or more PDEs, of which an example PDE 36 is shown.

Commonly, the MPC 34 will comprise a program application that resides on a service control point (SCP) platform, such as the SCP made by Telcordia Technologies for instance. (For instance, the MPC may be a Safety First™ Location Manager from Openwave® or a suitable alternative.) Thus, the MPC may be considered to include the SCP processor, which can carry out the MPC program application, as well as other logic that the MPC is to execute. Further, the MPC could comprise logic in the form of hardware and/or firmware as well.

Each PDE, in turn, may be hardware, software or firmware on the platform or external to the platform, which the MPC 34 can invoke through any agreed means (e.g., through a subroutine call) to acquire a measure of a given WCD's current location.

Connected to the PSTN is then the location-based service 16, such as a PSAP or, more generally, an emergency services network. In typical practice, the location-based service (particularly a PSAP) may include an operator terminal 38, where a service operator may work to handle location-based service calls, such as 911 emergency calls for instance.

Further, the location-based service 16 is coupled by a communication network/link 40, such as a packet-switched network (e.g., the Internet), with the location-determination system 18. Through the link 40, the location-based service 16 can send a position request message to the location-determination system 18, seeking the location of a WCD that is calling the location-based service 16, and the location-determination system 18 may respond by providing a determined location of the WCD at issue.

The location-based service 16 may also be coupled through a communication network/link 42 with an automatic line identification (ALI) database 44, which conventionally holds the addresses where landline telephone numbers are registered. In normal practice, when the location-based service 16 receives a call from a landline telephone number (coming from a landline switch (not shown), the location-based service 16 would dip into the ALI database to determine the location of the calling party. On the other hand, when the location-based service 16 receives a call from a wireless telephone number (coming from MSC 24 for instance), the location-based service would send a position request message to the location-determination system 18, seeking to determine on the current location of the calling WCD.

In operation, when a user of a WCD 28, 30 places a call to a location-based service, the MSC would receive a call origination request from the WCD. Before connecting the call, the MSC may then conventionally encounter a trigger point in processing that causes the MSC to signal up to the location-determination system 18. Under well known industry standard IS-41, for instance, the MSC may send an origination-request (ORREQ) message to the location-determination system, providing the system with an indication of the calling WCD, such as its "mobile identification number" (MIN), mobile directory number (MDN), mobile station identifier (MSID) or the like.

In turn, the location-determination system 18 will then conventionally determine the location of the calling WCD, by applying a location-determination process such as one of those noted above. For instance, the MPC 34 may invoke the PDE to determine the location of the WCD through signaling with the WCD itself. The PDE may thus send to the MSC 24 a short message delivery point to point (SMDPP) message (according to well known industry standard IS-637) requesting the location of the WCD, and the MSC may responsively send a position-determination request message over an air interface to the WCD, pursuant to well known industry standard IS-801. Upon receipt of the position-determination request message, the WCD may then invoke a GPS receiver to acquire a reading of its current location, typically together with an uncertainty value. The WCD may respond with a position-determination response message to the MSC, providing the GPS location coordinates and uncertainty value, and the MSC may pass the GPS location coordinates and uncertainty value in an SMDPP message to the PDE. The PDE may then pass the position to the MPC.

Conventionally, the MPC 34 may then cache the determined location of the WCD and return to the MSC 24 a response to the origination request, directing the MSC to set up the call to the location-based service 16. In the response to the origination request, the MPC 34 can include the determined WCD location. In turn, the MSC 24 can include that determined location within a call setup message (e.g., ISUP message) that the MSC 24 sends to set up the call to the location-based service 16. Thereby, the location-based service 16 can receive the location of the WCD when it is receiving the call, so as to be able to readily serve the caller.

Alternatively, in the response to the origination request, the MPC 34 can provide a key code correlated with the cached location. In turn, the MSC 24 can include the key code within a call setup message (e.g., ISUP message) that the MSC 24 sends to set up the call to the location-based service 16. When the location-based service 16 receives the call setup message, the location-based service can then responsively send a position request message via link 40 to the location-determination system 18, seeking the cached location corresponding to the calling WCD and/or keycode. Under well known industry standard J-STD-036, the position request message may be an ESPOSREQ message. In response to the ESPOSREQ message, the MPC may then provide an position response message (an esposreq response) that specifies the location of the calling WCD.

3. Location Rules Engine

As noted above, the location-determination system 18 may be provided by a company other than the wireless service provider. Further, the location-based service 16 may also be provided by a company other than the wireless service provider. While communications protocols may ensure interoperability between the wireless serving network 14 and both the location-based service 16 and the location-determination system 18, unexpected or undesired behavior by any third party component or service could cause problems for the wireless service provider or others.

The present invention helps solve this problem by providing a location rules engine 50 external to the location-determination system, such as external to the MPC 34. For some purposes, it will make sense to have the rules engine coupled externally to the MPC 34 in such a way that position requests being sent to the MPC 34 will flow through the rules engine and position responses being sent from the MPC 34 will flow through the rules engine. For other purposes, it may make sense to have the rules engine coupled anywhere external to the MPC 34, in such a way that the MPC can access the rules engine, so that the MPC 34 can dip into the rules engine to acquire rules logic for use in determining the location of a given WCD.

Figure 3:
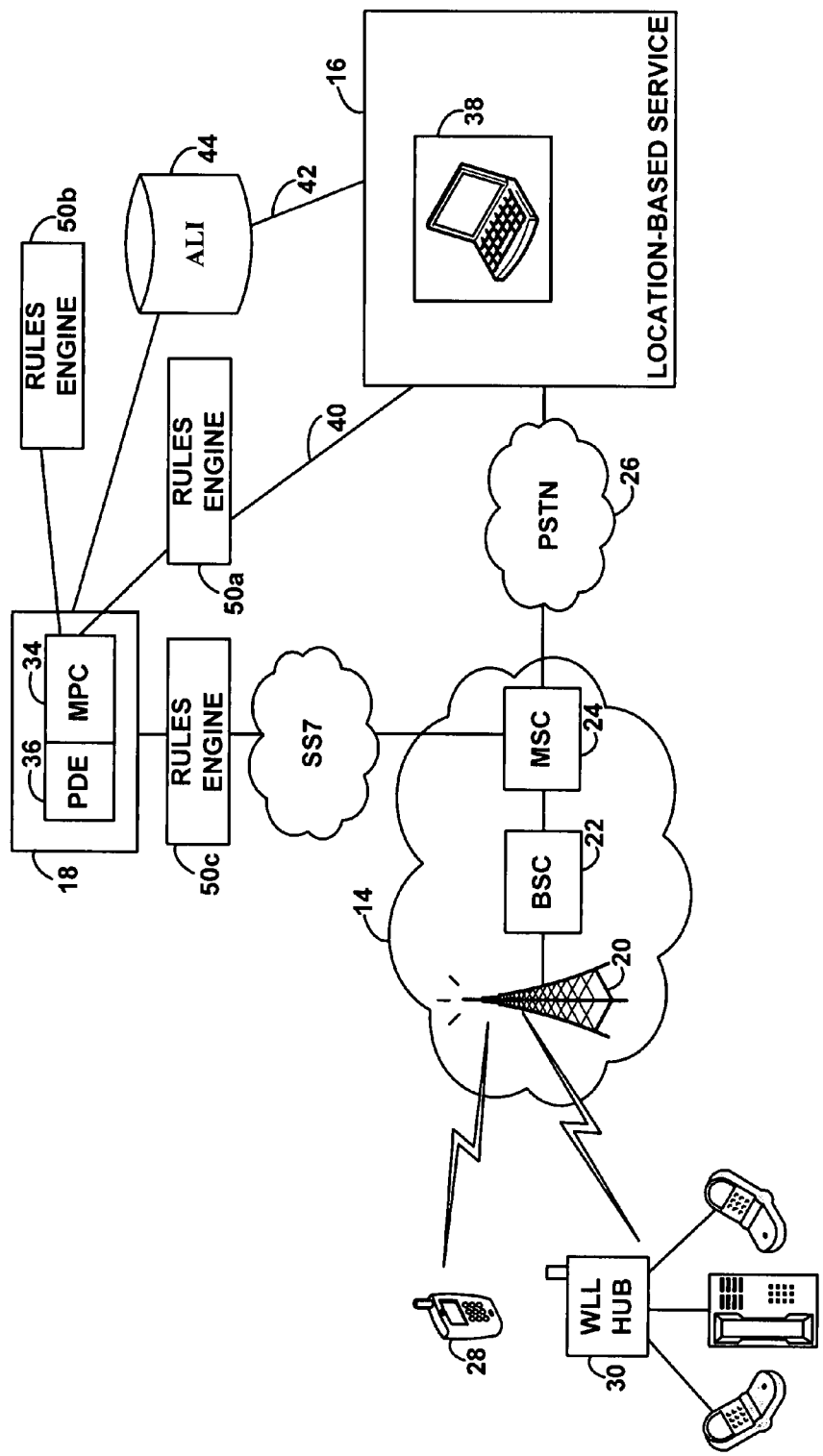
FIG. 3 is a block diagram showing example placements of a location rules engine in the arrangement of FIG. 2.

FIG. 3 depicts a variation of the arrangement of FIG. 2, illustrating some example placements of an exemplary location rules engine, designated by reference numerals 50*a*, 50*b* and 50*c*. As one possibility shown in FIG. 3, the location rules engine 50*a* can be connected directly to MPC 34, at the point where MPC 34 would normally connect with communication link 40. For instance, if link 40 is an IP network and MPC 34 would normally sit at a given IP address (or URL) on the network, the location rules engine 50*a* can be positioned instead at that IP address (or URL) and can be coupled in turn with the MPC. That way, whenever a position request message is sent purportedly to the MPC, the rules engine 50*a* can intercept the position request message and then optionally operate on the message in some way. Further, whenever the MPC outputs a position response message for transmission on link 40, the rules engine can intercept the position response message and then operate on the message in some way.

As another possibility shown in FIG. 3, the rules engine 50*b* could alternatively be located outside of the communication path between the MPC and the location-based service 16. For instance, if link 40 comprises a packet-switched network, the rules engine 50*b* could reside as a node somewhere on that network, accessible by the MPC through packet-switched communication. Alternatively, as shown, the rules engine 50*b* could be otherwise coupled with the MPC As yet another possibility shown in FIG. 3, the rules engine 50*c* could be situated between the MPC 34 and the MSC 24, such as at the point where the MPC 34 connects with the signaling network (e.g., SS7 network) that would normally couple the MPC 34 with the MSC 24. That way, the rules engine 50*c* could intercept messages being sent back and forth between the MPC and the MSC, such as ORREQ messages or SMDPP messages for instance.

Figure 4:
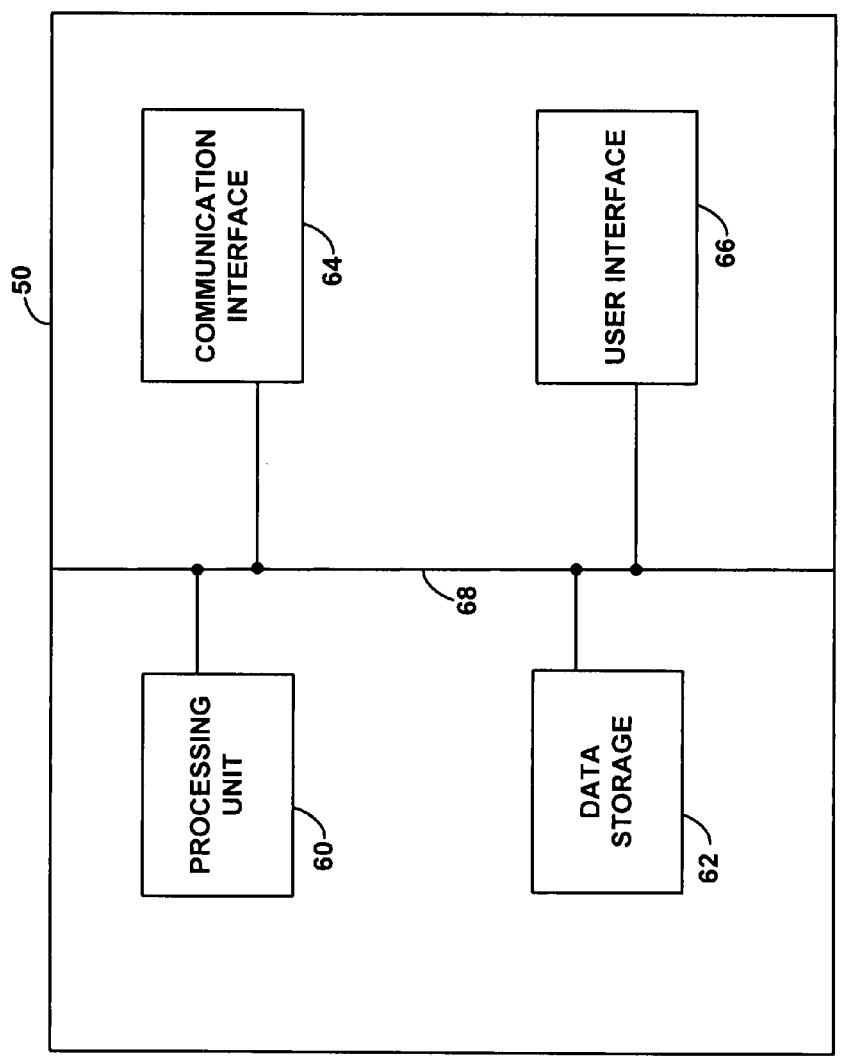
FIG. 4 is a block diagram depicting example functional components of a location rules engine.

As noted above, the rules engine can carry out various beneficial functions to control location-determination or, more particularly, to control the manner in which WCD location is requested, determined and reported. FIG. 4 is a simplified block diagram of a rules engine 50, showing functional components that the rules engine can include in order to carry out or otherwise support these functions. As shown in FIG. 4, the example rules engine 50 includes a processing unit 60, data storage 62, a communications interface 64, and a user interface 66, all of which may be coupled together by a system bus, network or other mechanism 68. Although the figure shows these components within a box, it should be understood that the components of the rules engine 50 could equally be distributed.

The processing unit 60 may comprise one or more general purpose processors (such as Intel brand processors, for instance) and/or one or more dedicated processors (e.g., DSP chips or ASICs), for carrying out the preferred functions. The data storage 62 may comprise volatile and/or non-volatile memory and/or other sorts of storage. The data storage 62 will hold machine language instructions executable by the processing unit 60 to carry out various function described herein. Further, the data storage 62 will hold machine language instructions executable by the MPC 34 to carry out other functions described herein.

The communications interface 64 preferably enables the rules engine to communicate with one or more entities with which it is linked. For instance, the communications interface 64 could comprise an Ethernet network interface card, which provides connectivity with a packet-switched network, such as a LAN, on which the MPC resides, so that the rules engine can engage in packet-switched communication with the MPC. As another example, such a LAN might be connected with link 40 to provide a path for communication with location-based service 16, and the LAN might be connected with the SS7 network to provide a path for communication with entities such as MSC 24 for instance.

The user interface 66, in turn, preferably facilitates user interaction with the rules engine, such as to set up the rules engine in a manner desired by the wireless service provider. The user interface 66 may, for instance, take the form of a web server, so that an administrator of the wireless service provider can conveniently access the rules engine via the Internet. Through the interface, a user may load new logic onto the rules engine or modify the logic present on the rules engine.

The functions that the rules engine 50 carries out or supports in practice may depend on specific requirements of the wireless service provider. As examples, the rules engine could carry out or support the following functions:

(A) Inhibiting repeated MPC dips. The rules engine may filter position requests from the location-based service, so as to prevent repeated dips into the MPC for a single call, and to thereby prevent repeated disruptions of the voice call.

(B) Tailoring position responses for location-based services. The rules engine can tailor position responses that the MPC sends to location-based services. In particular, the rules engine can format, filter or otherwise tailor position responses to be in a form required or desired by the receiving location-based service.

(C) Pushing location-determination logic to the MPC. The rules engine can supply logic for use by the MPC in determining the location of a WCD. For instance, the logic can cause the MPC to carry out functions such as (i) checking whether the WCD at issue is a fixed or mobile WCD and invoking a PDE only if the WCD is mobile, (ii) setting a cache timer in the MPC to define how long the MPC should cache a determined location, and (iii) setting one or more location-determination parameters that govern whether the MPC should report GPS location, cell/sector location, or some other sort of location for a given WCD.

The following sections will describe each of these functions in more detail. Further, as noted above, it should be understood that the rules engine could perform or facilitate other functions as well.

a. Use of Location Rules Engine to Preclude Repeated MPC Dips

In a typical implementation, once the MPC determines the location of a WCD, the MPC will cache the location for a fixed time period, such as 100 seconds for instance. If the MPC receives a position request message within that time period, the MPC can thus pull the location from storage and provide it in response, without having to determine the location again. This works well during initiation of a location-based service call (e.g., a 911 call), since the location-based service will typically receive the call setup message and request the caller's location within that limited time period.

Experience has shown, however, that a location-based service such as a PSAP will often request a caller's location on one or more additional occasions after initiation of the call, and particularly after the limited time period during which the MPC caches the location. For instance, an operator handling the call may routinely engage a button one or more times that causes the PSAP to send an ESPOSREQ request to the location-determination system, seeking a current location of the calling party.

Each time the location-based service 16 sends another position request to the MPC 34 when the MPC is no longer caching the WCD's location, the MPC will need to determine the location of the mobile station again. As described above, this means that each time the location-based service requests the WCD's location, the voice call between the WCD and the location-based service may be briefly interrupted as the WCD works to determine its location.

As presently contemplated, the location rules engine can be arranged to prevent repeated dips into the MPC for a single call, and to thereby prevent repeated interruptions of the voice call that could result from forcing the WCD to make repeated location determinations. To do so, the location rules engine can allow a first position determination request from the location-based service to pass to the MPC, and the location rules engine may itself cache the location that the MPC returns in a position response message. Each time the location rules engine receives another position request message for the same call, the location rules engine may then just return the already-determined (cached) location in response, without passing the position request along to the MPC.

Figure 5:
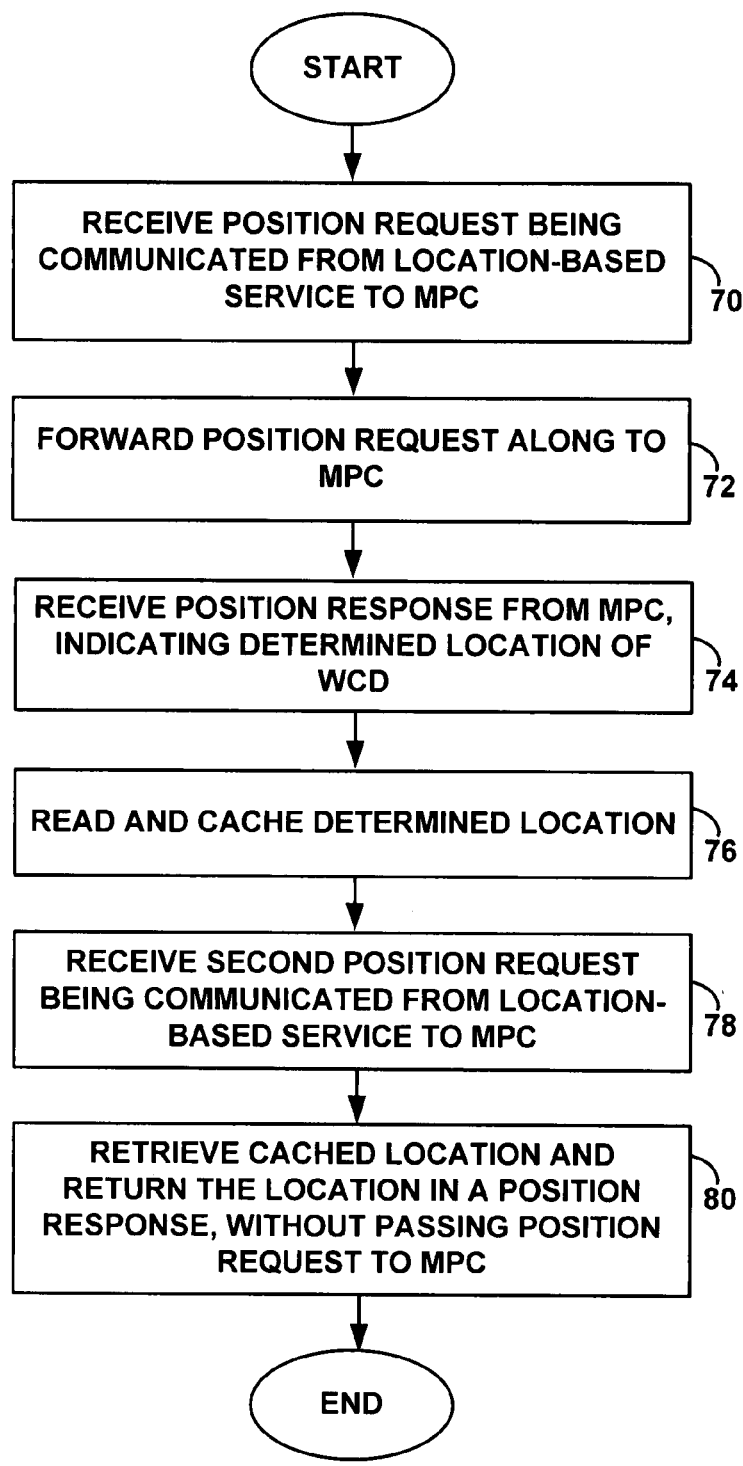
FIG. 5 is a flow chart depicting functions that can be carried out to preclude repeated dips into a location-determination system.

This process is depicted by the flow chart of FIG. 5. As shown in FIG. 5, at block 70, the rules engine 50 receives a position request (e.g., ESPOSREQ) that is being communicated from the location-based service 16 to the MPC, seeking the location of a WCD that is calling the location-based service. For instance, the rules engine may receive the position request during set up of the call to the location-based service. At block 72, the rules engine will then forward the position request along to the MPC 34. In an exemplary embodiment, the MPC 34 will preferably receive that position request within the time period that the MPC is set to maintain (cache) the determined location of the WCD, so the MPC can simply return a position response (e.g., esposreq) that provides that cached location. Thus, at block 74, the rules engine will then receive the position response indicating a determined location of the WCD at issue.

At block 76, the rules engine will then read that determined position from the position response message and store (cache) the determined location in data storage 62.

Thereafter, when the location-based service again requests the location of the WCD, such as when an operator that is handling the call pushes a button or otherwise requests determination of the WCD's location, the location-based service may send a second position request message (e.g., ESPOSREQ) to the MPC. Thus, at block 78, the rules engine will receive the second position request message. However, this time, the rules engine will not forward the position request message along to the MPC. Instead, at block 80, the rules engine will simply retrieve the location that it already received in a position response from the MPC, and the rules engine will return that location in a position response message (e.g., esposreq) to the location-based service.

From the perspective of the location-based service, it will thus appear that the MPC has provided a determined location of the WCD. However, in reality, the MPC would not even receive the second position request. Therefore, in the event the time period that the MPC maintains a determined location has passed, the MPC would not need to determine the location once again, and so the WCD would not be disturbed with a request to report its location.

This same process can be repeated for each subsequent position request from the location-based service. Thus, after an initial dip into the MPC, the rules engine could inhibit all subsequent dips into the MPC. Alternatively, the rules engine could be set to inhibit subsequent MPC dips for just a limited period of time, such as 2-3 minutes. In particular, after the rules engine sends the first position request message along to the MPC, the rules engine can begin decrementing a timer and could inhibit all subsequent position request messages until a predefined time period expires. (The rules engine can do this by caching the determined location until the timer expires.) In this way, the location-based service could get an updated measure of the WCD's location, which could be helpful if the WCD moves.

Note that, as an alternative embodiment, the location rules engine could carry out this function if positioned between the MPC 34 and the MSC 24 as well. Positioned there, the rules engine could be programmed to intercept an SMDPP response message passing from the MSC to the MPC and to extract from the message a determined location provided by the WCD and to store that cache location for later reference. Thereafter, the next time the MPC sends an SMDPP request message to the MSC seeking the location of the WCD, the rules engine can intercept that request and simply respond with a report of the cached location of the WCD without passing the SMDPP request along to the MSC.

b. Use of Location Rules Engine to Tailor Position Responses

As noted above, an MPC may be arranged to provide a response to a position request in a standard format, providing a standard set of information. Yet some location-based service providers, such as some PSAPs, might want to have the position response data be formatted in a special manner or to include or exclude certain information. Unfortunately, if the MPC is set to provide position responses in a standard, fixed format, it may not be possible to accommodate the format desires of these location-based services.

To overcome this problem, the location rules engine 50 can be arranged to tailor the form of position responses to meet the needs or desires of location-based services. In particular, the rules engine may maintain a set of data that indicates what form the position response should take for each location-based service (or for each class of location-based service).

For instance, the rules engine may maintain in data storage 62 a set of position response templates, each defining a form for presentation of a position response. And the rules engine may maintain in data storage 62 a table of data that correlates each location-based service with a given one of the position response templates. (If no correlation is provided for a given location-based service, a default template could be used, or the rules engine could default to not modifying the form of the position response at all.)

Each template could itself comprise an XML script or other set of instructions that indicates how the rules engine should process a position response to put it in the desired form. For example, a template could specify that the rules engine should convert certain text fields of the position response into all capital letters. As another example, a template could specify that the rules engine should order the fields of the position response in a particular order or should offset fields by a certain distance from the beginning of the response. As still another example, a template could specify that the rules engine should convert one or more values in the position response into some other form. For instance, the template could specify that the rules engine should convert latitude/longitude coordinates in a position response into a street address, by querying a suitable mapping database. And as still another example, a template could specify that the rules engine should filter the position response in some way, such as to remove one or more designated fields and/or values from the position response. Other examples are possible.

When the rules engine receives a position request from a location-based service, the position request will carry an identifier of the location-based service making the request. For instance, if the location-based service is a PSAP, the ESPOSREQ would contain a PSAP-ID. The rules engine may then use that identifier as a basis to select a position response template, so as to determine how to structure a position response being sent to that location-based service.

Figure 6:
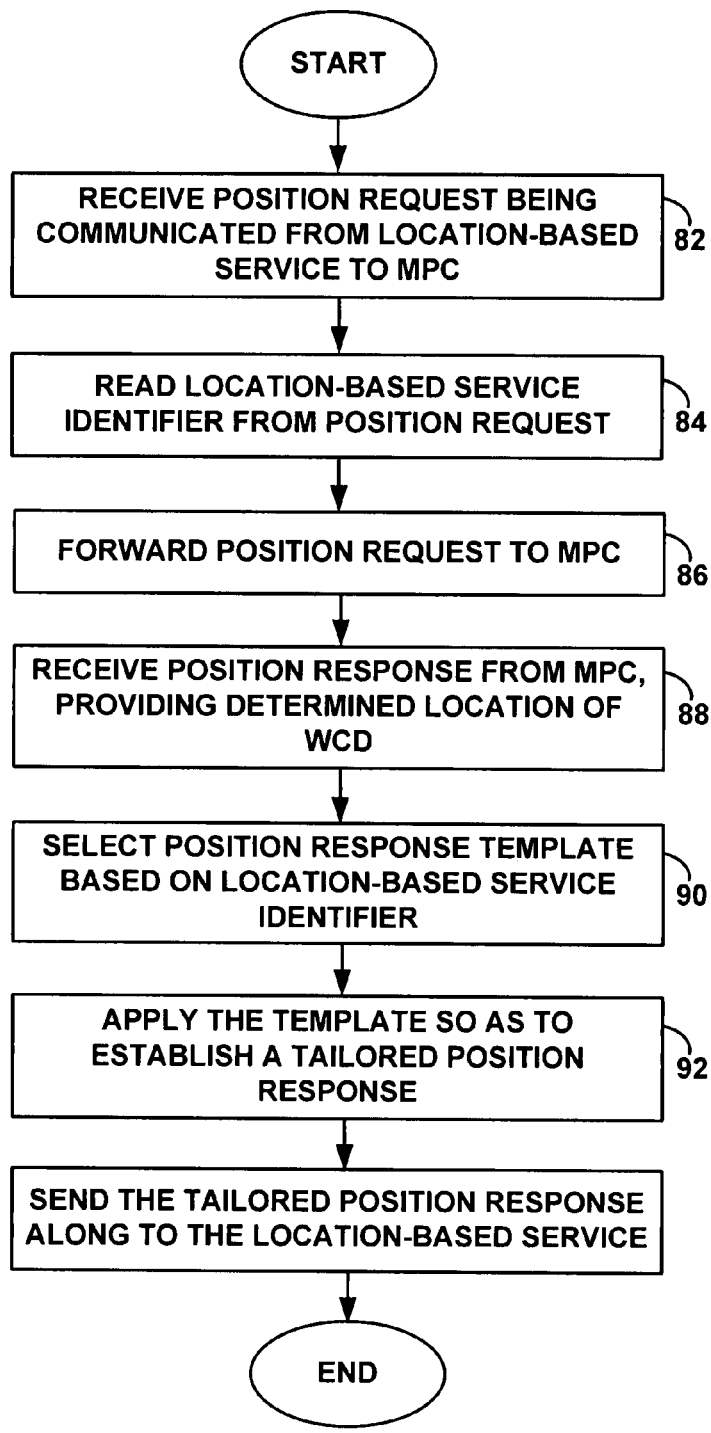
FIG. 6 is a flow chart depicting functions that can be carried out to tailor position responses being communicated from a location-determination system to a location-based service.

FIG. 6 depicts this process by way of example. As shown in FIG. 6, at block 82, the rules engine 50 receives a position request that is being communicated from a location-based service to the MPC, seeking the location of a WCD. At block 84, the rules engine reads a location-based service identifier from the request, and, at block 86, the rules engine forwards the position request along to the MPC for processing. At block 88, the rules engine then receives a position response from the MPC, providing a determined location of the WCD at issue. (Alternatively, applying the arrangement described above, the rules engine could itself generate a position response using cached location information, without involving the MPC.)

At block 90, the rules engine selects a template from data storage 62, based on the location-based service identifier. That is, the rules engine determines which template corresponds with the location-based service identifier. At block 92, the rules engine then applies the template to format, filter (e.g., remove aspects of), or otherwise tailor the position response, so as to establish a tailored position response. And at block 94, the rules engine then sends the tailored position response along to the location-rules engine.

Advantageously, the rules engine can thereby provide given location-based services with specially tailored position responses, without the need to modify the operation of the MPC, e.g., without requiring the MPC to adopt logic that tailors position responses based on the identity of the requesting location-based services.

c. Use of Location Rules Engine to Supply External Location-Determination Logic

As further noted above, an MPC is typically configured to apply a fixed set of location-determination logic when determining the location of any WCD, and if the wireless service provider wants to change the way the MPC operates, the wireless service provider would need to work with the MPC vendor to arrange for revisions of the MPC program logic.

An exemplary embodiment of the present invention helps to overcome this problem by providing a set of supplemental rules logic within the location rules engine 50, and having the MPC refer to and apply that rules logic each time the MPC seeks to respond to a position request. (Advantageously, this could require modifying the MPC program logic just once, to program the MPC to dip into the rules engine whenever the MPC receives a position request.) In particular, in accordance with the exemplary embodiment, the rules engine will include in data storage 62 a rules table (or other rules data) that specifies one or more rules that the MPC should apply when responding to a position request.

The rules table could, for instance, correlate each WCD, or class/range of WCDs, with a particular set of one or more rules that the MPC is to apply. Thus, when the MPC receives a position request seeking the location of a particular WCD, the MPC could dip into the rules engine and learn what rule(s) to apply in responding to the position request. Alternatively or additionally, the rules table could correlate each location-based service, or class/range of location-based services (e.g., "all PSAPs"), with a particular set of one or more rules that the MPC is to apply. Thus, when the MPC receives a position request from a given location-based service, the MPC could dip into the rules engine and learn what rule(s) to apply in responding to the position request. Still further, the rules table could provide one set of rules to apply when the MPC receives a position request from an MSC (e.g., as an ORREQ), and a different set of rules to apply when the MPC receives a position request from a location-based service (e.g., as an ESPOSREQ).

The rules specified by the rules table may define parameters or actions that modify default location-determination logic employed by the MPC. For instance, as noted above, the rules could cause the MPC (i) to check whether the WCD at issue is a fixed or mobile WCD and to invoke a PDE only if the WCD is mobile, (ii) to set a cache timer in the MPC to define how long the MPC should cache the location that it determines for a given WCD, or (iii) to set one or more location-determination parameters that govern whether the MPC should report GPS location, cell/sector location, or some other sort of location of a WCD. These functions will be described in more detail below.

In the exemplary embodiment, the rules that are specified by the rules table may take the form of program logic (e.g., C++ routines, or Java scripts), such as software routines, executable by the MPC. The program logic could reside on the rules engine itself, and the MPC could access and execute the program logic right from the rules engine, over a network connection for instance. Alternatively, the program logic could reside on the MPC, and the MPC can execute the program logic as indicated by the rules table. The program logic could reside elsewhere as well.

Entries in the rules table could list rules as subroutine calls or function calls, with appropriate arguments. Further, a given record in the rules table could list multiple rules, and the MPC would preferably execute the indicated program logic in the order listed. In this way, the rules engine could cause the MPC to carry out location-determination functions in a particular order.

FIG. 7 depicts an example rules table. As shown in FIG. 7, the rules table includes records keyed to ranges of WCD-identifiers (such as MIN, MDN or MSID for instance). Each record then lists one or more rules that the MPC should apply when responding to a position request seeking the location of a WCD having a WCD-ID that falls within the designated range. For example, the first entry indicates that, in response to a position request seeking the location of a WCD having a WCD-ID within the range 9135551111-9135552222, the MPC should first execute a routine called MOBILE-OR-FIXED and should next execute a routine called OVERLAP-THRESHOLD. And as another example, the next entry indicates that, in response to a position request seeking the location of a WCD having a WCD-ID within the range 9135552223-9135554444, the MPC should first execute a routine called CACHE-TIMER, passing a value of 200 to the routine, and should next execute the OVERLAP-THRESHOLD routine.

Although the example rules table lists each routine by routine name, the rules table could just as well list each routine with a designation of where the routine is located, such as whether the routine is located in storage on the rules engine, or in storage on the MPC. Further, although the example rules table lists each entry covering a range of WCD-IDs, it should be understood that a given entry could be specific to a single WCD-ID if desired.

The following subsections will describe operation and use of routines MOBILE-OR-FIXED, CACHE-TIMER, and OVERLAP-THRESHOLD. It should be understood, however, that these are just examples and that others are possible as well.

(i) Determining Whether a WCD is Mobile or Fixed

As noted above, a WCD can be a mobile WCD or a fixed WCD. For instance, a mobile WCD may be a cell phone or wirelessly-equipped PDA or personal computer. And a fixed WCD might be a WLL hub or a wall-mounted cell phone.

Given that a fixed WCD is located at a fixed position, it would make sense to determine the location of the fixed WCD in the same way that the location of a landline telephone is determined. Namely, it would make sense to store the location of the fixed WCD in ALI database 44 and to dip into that database to determine the location of the fixed WCD, rather than invoking a PDE that would determine the location of the WCD by triangulation or by asking the WCD to report its GPS location coordinates. Unfortunately, however, when an MPC receives a position request seeking the location of a WCD, the MPC will normally invoke a PDE (unless the MPC has cached the location of the WCD already).

The rules engine can change this process in a given instance by causing the MPC to execute a MOBILE-OR-FIXED routine before the MPC carries out the MPC's normal location-determination logic. That is, the rules engine could cause the MPC to execute the MOBILE-OR-FIXED routine before the MPC invokes a PDE to determine the location of the WCD. Further, the ALI database 44 would be loaded with the locations of fixed WCDs, each keyed to WCD-ID, and a communications link would be provided to facilitate communication between the MPC and the ALI database.

In accordance with the exemplary embodiment, when the MPC executes the MOBILE-OR-FIXED routine, the MPC will dip into a database (not shown) that distinguishes WCDs as mobile or fixed, based on their WCD-IDs. Preferably, the database would be stored on the rules engine, so the wireless service provider could readily update the database (to indicate WCD-IDs that are mobile or those that are fixed) without having to modify the MPC. Alternatively, the MOBILE-OR-FIXED subroutine call could itself include an argument that specifies whether the WCD is mobile or fixed.

According to the MOBILE-OR-FIXED routine, if the MPC determines that the WCD at issue is fixed, then the MPC will dip into ALI database 44 to determine the fixed location (e.g., street address or geographic coordinates) of the WCD. The MPC will then forego invoking a PDE to determine the WCD's location. On the other hand, if the MPC determines that the WCD at issue is mobile, then the MPC will proceed to carry out its normal location-determination logic (e.g., invoking a PDE), also applying any further rules specified by the rules engine.

(ii) Setting the Cache Timer

As noted above, an MPC is usually arranged to cache a determined location of a WCD for a fixed period of time. If, during that time, the MPC receives a position request seeking the location of the WCD, the MPC can conveniently respond with the cached location. On the other hand, after that time expires, if the MPC receives a position request seeking the location of the WCD, the MPC will again determine the location of the WCD in order to respond to the request.

In the exemplary embodiment, the rules engine can cause the MPC to execute a CACHE-TIMER routine that will set the cache time period to a designated value. The CACHE-TIMER routine could be as simple as setting the value of a timer variable in the MPC, which the MPC is then programmed to use when initializing its cache timer.

Referring to FIG. 7, for instance, the CACHE-TIMER call for the second WCD range includes the argument 200. When the MPC executes the CACHE-TIMER routine with this argument, the MPC would set its cache timer to 200 seconds. On the other hand, the CACHE-TIMER call for the last WCD range in the rules table includes the argument 0 (zero). When the MPC executes the CACHE-TIMER routine with this argument, the MPC would set its cache timer to zero seconds, i.e., the MPC would not cache the location that it determines.

Note that the CACHE-TIMER routine could be arranged to function differently depending on whether the MPC has received a position request from the MSC or from a location-based service. For instance, in a scenario where the MPC receives a position request in the form of an ORREQ from an MSC, the CACHE-TIMER routine could leave the default MPC cache timer alone. Whereas, in a scenario where the MPC receives a position request from a location-based service, the CACHE-TIMER routine could set the cache timer to the value indicated in the subroutine call. Other variations are possible.

Advantageously, a wireless service provider can thus set the cache timer to whatever value the wireless service provider would like, for particular WCDs or location-based services. And the wireless service provider can conveniently revise the settings in the rules engine without having to modify the MPC program logic.

(iii) Setting an Overlap Threshold

As noted above, when a PDE obtains a measure of a WCD's location, the measure will typically be geographic coordinates together with an uncertainty value. In normal practice, an MPC may also obtain, from a wireless service provider database, a reference location for the WCD, which is usually a centroid of the cell/sector in which the WCD is operating, together with an "uncertainty" value that represents the size of that cell sector. The MPC will then compare circles representing the PDE-determined location with the reference location, and, based on the comparison, the MPC will select one of the two locations to use as a representation of where the WCD is located.

More particularly, the MPC will typically carry out an "overlapping circles" analysis. In the analysis, the MPC will consider two circles, (a) one centered at the PDE-determined location and having as a radius the uncertainty of that location, and (b) the other centered at the reference location and having as a radius the "uncertainty" of that location. The MPC will then determine if the two circles overlap more than a predefined threshold extent. If the circles overlap at least a predefined threshold extent, then the MPC will use the PDE-determined location as the location of the WCD. (I.e., the MPC will provide the PDE-determined location in a position response.) On the other hand, if the circles overlap less than the predefined threshold extent, then the MPC will use the reference location as the location of the WCD. (I.e., the MPC will provide the reference location in a position response.)

In existing arrangements, the MPC will use a fixed overlap threshold, such as 50% for instance. However, this threshold might not be sensible in all situations. For instance, in a very densely populated area, it might make sense to use a lower overlap threshold, and in a sparsely populated area, it might make sense to use a higher overlap threshold.

In accordance with the exemplary embodiment, the rules engine can cause the MPC to use a particular overlap threshold depending on various factors, such as the sector in which the WCD is operating. For instance, the rules engine can maintain a table or other set of data that specifies, for each sector in the wireless service provider's network, what overlap threshold the MPC should use. And the rules engine can cause the MPC to execute an OVERLAP-THRESHOLD routine that dips into that sector/threshold data to determine what overlap-threshold to use and that sets an overlap-threshold variable accordingly.

In a preferred embodiment, a position-request message that the MPC receives will include an indication of the sector in which the WCD at issue is currently operating (e.g., a sector-ID). Thus, upon receipt of the position request, the MPC would dip into the rules table and, if the rules table lists a call to the OVERLAP-THRESHOLD routine, the MPC would execute the OVERLAP-THRESHOLD routine. In executing the OVERLAP-THRESHOLD routine, the MPC would dip into the sector/threshold data to determine the overlap threshold to use, given the sector indicated in the position request. And the MPC would then use that overlap threshold when the MPC carries out the overlapping-circles analysis in response to the position request.

Advantageously, by configuring the sector/threshold data with desired threshold data, a wireless service provider can thus cause the MPC to use desired overlap-thresholds when conducting an overlapping-circles analysis.

Note that as an alternative arrangement, the OVERLAP-THRESHOLD call in the rules table can itself indicate the overlap-threshold that the MPC should use when applying an overlapping-circles analysis. For instance, a given call could be set forth in the rules table as "OVERLAP-THRESHOLD (30)" to cause the MPC to use an overlap threshold of 30%. Other examples are possible as well.

4. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. In a system comprising a wireless serving network, a location-determination system and a location-based service, wherein the location-based service has an identity, wherein the wireless serving network provides connectivity between a wireless communication device and the location-based service, and wherein the location-based service sends a position request to the location-determination system to seek a location of the wireless communication device, a method comprising:

providing a rules engine in a communication path between the location-determination system and the location-based service;

receiving into the rules engine a position response provided by the location-determination system in response to the position request;

tailoring the position response at the rules engine in a manner dependent on the identity of the location-based service, so as to establish a tailored position response, wherein tailoring the position response in a manner dependent on the identity of the location-based service comprises (i) reading a location-based service identifier from the position request, (ii) selecting a position response template based on the location-based service identifier, and (iii) applying the position response template to tailor the position response; and sending the tailored position response along the communication path from the rules engine to the location-based service.

2. The method of claim 1, wherein the location-based service sends the position request to the location-determination system when the wireless communication device calls the location-based service.

3. The method of claim 1, wherein the location-determination system comprises a mobile positioning center, wherein the communication path comprises a packet-switched network, and wherein providing a rules engine in the communication path comprises:

connecting the rules engine between the mobile positioning center and the packet-switched network, so that communications passing between the mobile positioning center and the location-based service will pass through the rules engine.

4. The method of claim 1, wherein the position request comprises an ESPOSREQ message, and wherein the position response comprises an esposreq response message.

5. The method of claim 1, further comprising maintaining data that correlates location-based service identifiers with position response templates, and wherein selecting the position response template based on the location-based service identifier comprises referring to the data.

6. The method of claim 1, wherein the position response template indicates how the rules engine should process the position response.

7. The method of claim 1, wherein the position response template instructs the rules engine to take an action selected from the group consisting of (i) converting format of one or more fields in the position response, (ii) removing one or more values from the position response, and (iii) converting one or more values in the position response.

8. The method of claim 1, wherein the position response template comprises an extensible markup language (XML) script.

9. The method of claim 1, wherein the location-based service comprises a public safety access point.

10. In a system comprising a wireless serving network, a location-determination system and a location-based service, wherein the location-based service has an identity, wherein the wireless serving network provides connectivity between a wireless communication device and the location-based service, and wherein the location-based service sends a position request to the location-determination system to seek a location of the wireless communication device, the improvement comprising:
   a rules engine disposed in a communication path between the location-determination system and the location-based service, wherein the rules engine receives a position response provided by the location-determination system in response to the position request;
   tailoring-logic executable by the rules engine to tailor the position response in a manner dependent on the identity of the location-based service, so as to establish a tailored position response, wherein the tailoring logic is executable to tailor the position response in a manner dependent on the identity of the location-based service by carrying out a process comprising (i) reading a location-based service identifier from the position request, (ii) selecting a position response template based on the location-based service identifier, and (iii) applying the position response template to tailor the position response, and wherein the rules engine sends the tailored position response along the communication path to the location-based service.

11. The improvement of claim 10, wherein the location-based service sends the position request to the location-determination system when the wireless communication device calls the location-based service.

12. The improvement of claim 10, wherein the location-determination system comprises a mobile positioning center, wherein the communication path comprises a packet-switched network, and wherein providing a rules engine in the communication path comprises:
   connecting the rules engine between the mobile positioning center and the packet-switched network, so that communications passing between the mobile positioning center and the location-based service will pass through the rules engine.

13. The improvement of claim 10, wherein the position request comprises an ESPOSREQ message, and wherein the position response comprises an esposreq response message.

14. The improvement of claim 10, further comprising a set of data that correlates location-based service identifiers with position response templates, wherein the tailoring-logic is executable to select the position response template based on the location-based service identifier by referring to the data.

15. The improvement of claim 10, wherein the position response template indicates how the rules engine should process the position response.

16. The improvement of claim 10, wherein the position response template instructs the rules engine to take an action selected from the group consisting of (i) converting format of one or more fields in the position response, (ii) removing one or more values from the position response, and (iii) converting one or more values in the position response.

17. The improvement of claim 10, wherein the position response template comprises an extensible markup language (XML) script.

* * * * *